United States Patent
Gonzalez et al.

(10) Patent No.: US 12,494,961 B2
(45) Date of Patent: Dec. 9, 2025

(54) LEVERAGING TRANSPORT ALARMS TO IDENTIFY LINK REDUNDANCY FAILURES

(71) Applicant: T-Mobile Innovations LLC, Overland Park, KS (US)

(72) Inventors: Jose A. Gonzalez, Maitland, FL (US); Brian D. Lushear, Winter Springs, FL (US); Todd M. Szymanski, Winter Park, FL (US)

(73) Assignee: T-Mobile Innovations LLC

( * ) Notice: Subject to any disclaimer, the term of this patent is extended or adjusted under 35 U.S.C. 154(b) by 307 days.

(21) Appl. No.: 18/448,132

(22) Filed: Aug. 10, 2023

(65) Prior Publication Data

US 2025/0055750 A1     Feb. 13, 2025

(51) Int. Cl.
*H04W 24/10* (2009.01)
*H04L 41/0604* (2022.01)

(52) U.S. Cl.
CPC ......... *H04L 41/0604* (2013.01); *H04W 24/10* (2013.01)

(58) Field of Classification Search
CPC .... H04L 41/0604; H04W 24/10; H04W 24/04
See application file for complete search history.

(56) References Cited

U.S. PATENT DOCUMENTS

| | | | |
|---|---|---|---|
| 2012/0052857 A1* | 3/2012 | Kumar | H04W 24/08 455/466 |
| 2025/0023768 A1* | 1/2025 | Gonzalez | H04L 41/0654 |

* cited by examiner

*Primary Examiner* — Chuong A Ngo

(57) ABSTRACT

A method of resolving cell site backhaul link redundancy failures in a communication system comprises receiving a plurality of alarms from a plurality of network elements (NEs) in the communication system, determining that the alarms include at least two alarms associated with a cell site, including a first alarm indicating that a path through an alternative access vendor network to the cell site is down and a second alarm indicating that the cell site is unreachable, generating a first incident report indicating a lack of diverse paths through the alternative access vendor network to the cell site, and obtaining, based on an LSE incident report for the alarms, a second incident report comprising a compensation or credit from the alternative access vendors for failing to provide contracted-for diverse paths through the alternative access vendor networks.

20 Claims, 8 Drawing Sheets

LEVERAGING TRANSPORT ALARMS TO IDENTIFY LINK REDUNDANCY FAILURES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NE) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a method of resolving cell site backhaul link redundancy failures in a communication system is disclosed. The method comprises receiving, by an incident management application executing on a computer system, a plurality of alarms from a plurality of network elements (NEs) in the communication system. In an embodiment, the alarms are associated with a large-scale event (LSE) experienced by at least the NEs. The method comprises determining, by the incident management application, that the alarms include at least two alarms associated with a cell site, including a first alarm indicating that a path through an alternative access vendor network to the cell site is down and a second alarm indicating that the cell site is unreachable. The alternative access vendor network is operated by an alternative access vendor. In an embodiment, the method comprises generating, by an incident reporting application executing on the computer system, a first incident report indicating a lack of diverse paths through the alternative access vendor network to the cell site, transmitting, by the incident reporting application, the first incident report to a server associated with the alternative access vendor to reconfigure diverse paths through the alternative access vendor network to the cell site, and obtaining, by the incident reporting application, based on an LSE incident report for the alarms, a second incident report comprising at least one of identifications of unreachable cell sites, identifications of alternative access vendors that did not supply diverse paths in alternative access vendor networks to the unreachable cell sites, a duration of time that the cell sites remained unreachable, and a compensation or credit from the alternative access vendors for failing to provide contracted-for diverse paths through the alternative access vendor networks.

In another embodiment, a telecommunication network management system is disclosed. The system comprises an incident management application executing on a first computer system and an incident management application that executes on a second computer system. The incident management application is configured to receive a plurality of alarms from a plurality of network elements (NEs) in the telecommunication network management system and determine that the alarms include a pattern of alarms associated with a cell site, wherein pattern of alarms comprises a first alarm indicating that a path through an alternative access vendor network to a cell site is down and a second alarm indicating that the cell site is unreachable. The incident management application is configured to generate a first incident report indicating a lack of diverse paths through the alternative access vendor network to the cell site, and obtain a second incident report identifying at least one of unreachable cell sites, alternative access vendors that did not supply diverse paths in alternative access vendor networks to the unreachable cell sites, a duration during which the cell sites remained unreachable, and a compensation or credit from the alternative access vendor for failing to configure the diverse paths in the alternative access vendor networks to the cell sites.

In yet another embodiment, a method of resolving cell site backhaul link redundancy failures in a communication network is disclosed. The method comprises identifying, by an incident management application executing a computer system, a pattern of alarms associated with a cell site, including a first alarm indicating that a path through an alternative access vendor network to a cell site is down and a second alarm indicating that the cell site is unreachable. The alternative access vendor network is operated by an alternative access vendor. The method further comprises generating, by an incident reporting application executing on the computer system, a first incident report indicating a lack of diverse paths through the alternative access vendor network to the cell site. The method further comprises obtaining, by the incident reporting application, data describing a lack of redundancy in paths through the alternative access vendor network to the cell site, wherein the data comprises at least one of an identification of the alternative access vendor, an identification of the cell site, a location of the cell site, a duration during which the cell site remained unreachable, or a time of receiving the first alarm and the second alarm, and obtaining, by the incident reporting applications, a second incident report including the data and a compensation or credit from the alternative access vendor for failing to configure the diverse paths in the alternative access vendor networks to the cell sites.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
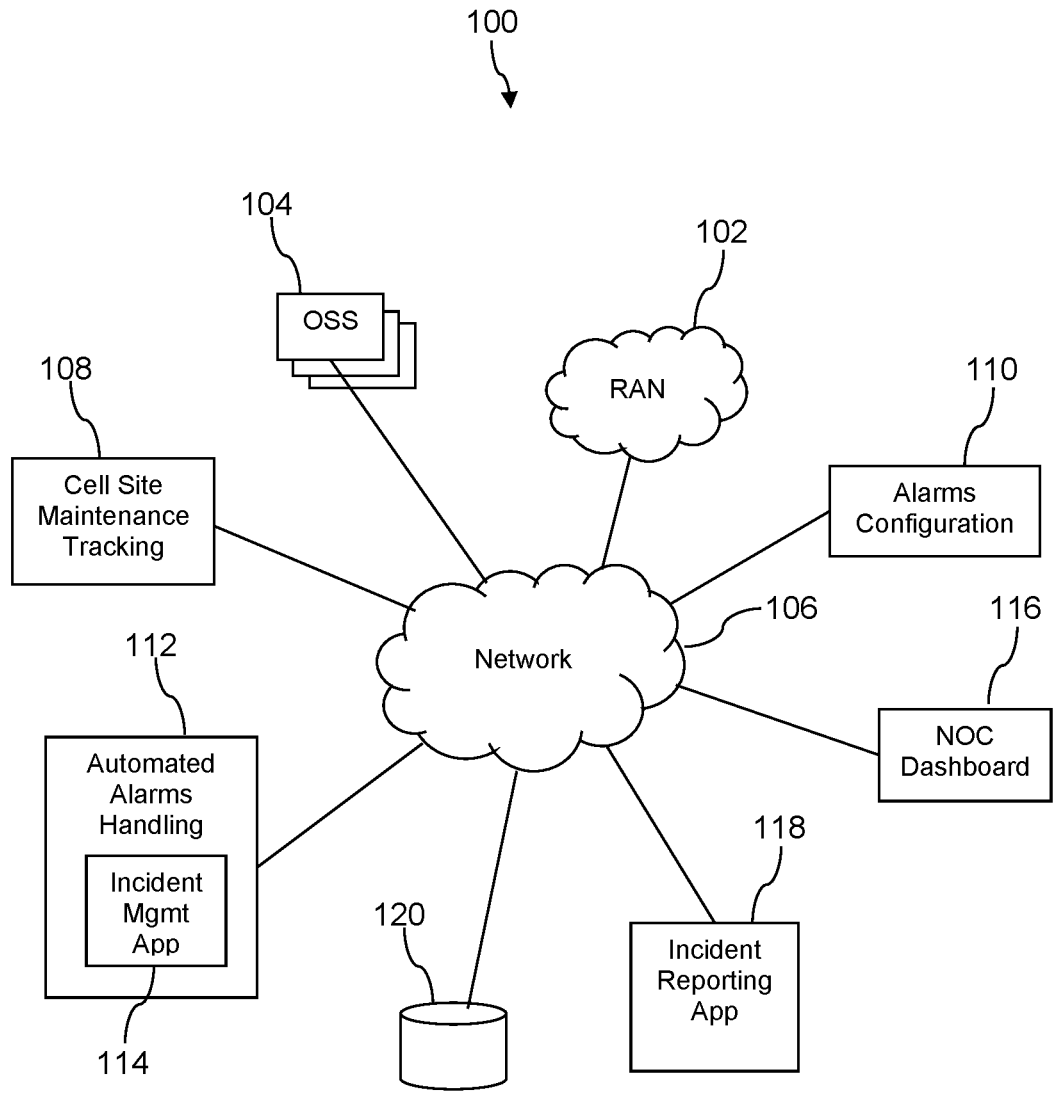
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A cell site in a radio access network (RAN) operated by a telecommunications service provider may connect to a backhaul network using one or more backhaul links. The backhaul links may be provided by an alternative access vendor (AAV) different from the telecommunications service provider operating the cell site. The AAV may be used to provide the backhaul links since the AAV owns and operates more sophisticated devices and equipment for providing high bandwidth connections via fiber at relatively lower costs.

For example, the cell site may be coupled to a network-to-network interface (NNI) in an AAV network via a single physical link. Within the AAV network, multiple NNIs may be coupled to Metro Ethernet Aggregating Device (MAD) routers via separate physical links. The AAV may configure multiple diverse logical paths through various combinations of the links within the AAV network, resulting in redundant and diverse logical paths through the AAV network to the cell site.

Indeed, the telecommunications service provider may contract with the AAV to provide redundancies through the AAV network to ensure that multiple diverse logical paths are configured within the AAV network to reach the cell site. In other words, the telecommunications service provider may specifically pay for redundancies in logical paths in the AAV network, such that when one logical path to the cell site fails, the AAV network may reroute the traffic through another logical path to reach the cell site. As used herein, the term "path" may be used synonymously with the term "logical path."

Sometimes, one or more paths to the cell site in the AAV network may go down for various reasons (e.g., reconfiguration of paths in the AAV network, failure of nodes, links, or ports, etc.). However, the telecommunications service provider may not have access to details regarding these path failures or the states of the devices/equipment in the AAV network to be aware of the failed paths in the AAV network. Since the AAV network is operated by a vendor external to the telecommunications service provider, the telecommunications service provider is typically not aware of any issues that may arise in the AAV network. Under a standard contract between the AAV and the telecommunications service provider, the AAV should provide redundant paths in the AAV network to the cell site even if one of these paths go down. When a redundant path is configured for the cell site, then the telecommunications service provider and end customer may be unaware of a failure of a redundant path in the AAV network, and may only be made aware of actual physical failures in the AAV (e.g., fiber cut) that result in a complete failure/unreachability of the cell site.

However, in some cases, redundant diverse paths to the cell site are not actually configured in the AAV network by the AAV, even though the AAV may be contractually obligated to provide redundant diverse paths to the cell site. In addition, the telecommunications service provider may not be aware when the AAV is not providing these redundant diverse paths in the AAV network, until after a cell site becomes completely unreachable due to a path failure and lack of redundancies. When a path to the cell site goes down, the cell site itself may be subject to a fault or failure as well. This may result in the raising of one or more alarms received by one or more OSSs, and propagated upwards to a central monitoring station such as a NOC. However, the lack of redundancies in the AAV may still go unaddressed and the telecommunications service provider may be paying for a service not actually provided by the AAV.

The embodiments disclosed herein provide a technical solution to the foregoing technical problem in the field of network operations and maintenance by automatically identifying patterns of these alarms and generating two different incident reports to resolve not only the failed path but also the lack of redundancy provided by the AAV. In an embodiment, a telecommunications network management system includes an incident management application and an incident reporting application that work together to generate the incident reports to resolve the failed path and lack of redundancy in the AAV network.

In an embodiment, the incident management application may receive alarms from multiple different network elements (NEs), such as cell sites, in a communication network. In some cases, these alarms may be traceable to a common cause, and as such, associated with a large-scale event (LSE). For example, the LSE may be triggered when at least a threshold quantity of NEs (e.g., six cell sites) in the area or connected by a common MAD router experience the same alarm around the same time. There may be a high probability that a single fault triggered all of these alarms on the separate cell sites. When most cell sites have lost the redundancy but some cell sites are completely out-of-service, it may be an indication that these out-of-service cell sites do not have the proper redundancy. In this way, the lack of redundancy in paths to a cell site may also give rise to multiple alarms, signaling an LSE. However, the alarms need not be associated with an LSE, and can instead be associated with isolated incidents of failures at one or more cell sites in the communication network. In some cases, the alarms may include transport alarms, which are directed to describing failures or faults on a transport path to the cell site. A transport alarm or a backhaul alarm may refer to alarm that is triggered when there is partial or full loss of connectivity to an NE.

The incident management application may monitor and extract the alarms to determine whether the alarms include a pattern of alarms that are each with a cell site. The pattern of alarms may include at least two different types of alarm, a first type of alarm and a second type of alarm. The first type of alarm may indicate that a path through the AAV network to the cell site is down. The second type of alarm may indicate that the cell site is unreachable. Each alarm may include data describing the failure identified in the alarm, such as, for example, a time of the failure/outage, a duration of the failure/outage, a location of the failure/outage, an identification of the AAV or AAV network in which the failure/outage occurred, an identification of the affected cell site, and a description of the failure/outage. For example, the description may indicate that a logical path to the cell site or a physical path (e.g., fiber) to the cell site is down or has failed, that there is a power outage somewhere along the path, a link, node, port, or element along the path has failed, etc.

The pattern of alarms associated with the cell site may be identified by automation such as using a computer program or script executing on a computer. The automation may define a set of criteria regarding the alarms associated with the cell site for the incident management application to determine that a path in the AAV network to the cell site is down and that the AAV network has not provided any redundancies for the cell site (e.g., any other diverse paths through the AAV to the cell site). The criteria may involve identifying the pattern of alarms (i.e., the at least two alarms described above) in relation to a single cell site.

The criteria may also involve an analysis of incident reports associated with a LSE to determine a first quantity of cell sites associated with only the path failure alarm versus a second quantity of cell sites associated with both the path failure alarm and the site unreachable alarm. In an embodiment, the incident management application may separately monitor each redundant path to the cell site. The incident management application may detect the occurrence of an LSE, indicating a single fault event resulting in multiple alarms, when the same alarm occurs on multiple cell sites or on multiple paths to the cell site around the same time. When a cell site triggers an alarm for multiple paths being down, this may indicate that there is a lack of redundant diverse paths to the cell site.

The criteria may specify that when the first quantity is significantly larger than the second quantity (e.g., by a threshold difference), then the incident management application may determine that the cell sites associated with both the path failure alarm and the site unreachable alarm are indeed in a situation in which the AAV network lacks redundant diverse paths to the cell sites. However, when the first quantity is substantially similar to the second quantity (e.g., within a difference range), then the incident management application may determine that the cell sites may be experiencing some other issue not necessarily related to the lack of redundant diverse paths in the AAV network.

The incident management application may determine that the criteria is met and that redundant diverse paths to the cell site are not configured in the AAV network. In this way, the incident management application may use the received alarms from cell sites to determine the state of the components in the AAV network even though the AAV network is owned and operated by a separate entity. The incident reporting application may then be triggered to take remedial action accordingly.

In an embodiment, the incident reporting application may generate two different incident reports (i.e., a first incident report and a second incident report) in response to determining that redundant diverse paths are not configured in the AAV network. The first incident report may indicate the lack of redundant paths through the AAV network to the cell site. In some cases, the first incident report may include other data, such as, for example, an indication of a location of the failure/outage and an identification of the cell site. The incident reporting application may transmit this first incident report to the AAV (e.g., a server operated by the AAV), signaling the AAV to resolve the failure/outage occurring at the AAV network. For example, the first incident report may be a break fix ticket, which signals to the AAV that a broken component in the AAV network needs to be fixed such that traffic may properly flow to and from the cell site via the AAV network.

The second incident report may be different from the first incident report. The second incident report may provide more detailed data regarding the two alarms and/or the failure of the path. The detailed data in the second incident report may include, for example, an identification of the unreachable cell site, an identification of the AAV that did not supply the diverse paths in the AAV network, a duration of time that the cell site remained unreachable, a fair compensation or credit from the AAV for failing to provide the contracted-for redundant diverse paths in the AAV network, and/or any other relevant information.

The incident reporting application may generate the second incident report based on an LSE incident report describing alarms associated with an LSE. In this case, the second incident report may include data describing identifications of the unreachable cell sites identified in the LSE incident report based on the foregoing criteria, identifications of alternative access vendors that did not supply diverse paths in the AAV networks to the unreachable cell sites, a duration of time that the cell sites remained unreachable, and a compensation or credit from the AAVs for failing to provide contracted-for diverse paths through the alternative access vendor networks.

An operator at the NOC of the telecommunications service provider may use the second incident report to request a form of credit or compensation from the AAV since the contracted-for redundant diverse paths to the cell site were not properly provided. Alternatively, the second incident report may be transmitted directly to the AAV (e.g., server operated by the AAV) as a form of requesting credit or compensation from the AAV.

As further described herein, the embodiments are directed to increasing network availability by ensuring the proper transmission of traffic through contracted-for redundant diverse paths in the case a single path in an AAV network fails. In other words, the embodiments disclosed herein may provide increased networked availability even when one or more paths may fail in the AAV network. Further, by reporting any lack of redundancies in the AAV network to the AAV and ensuring the configuration of redundant diverse paths in the AAV network, the embodiments disclosed prevent future outages in the AAV network, thereby conserving network and power resources.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting system (or application) 118, and a data store 120.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the system 100.

The cell site maintenance tracking system 108 is a system implemented by one or more computers. Computers are discussed further hereinafter. The cell site maintenance tracking system 108 is used to track maintenance activities on network elements (e.g., cell site equipment, routers, gateways, and other network equipment). When a network element (NE) is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity. Sometimes a maintenance action may extend beyond the scheduled maintenance window, pending alarms are no longer suppressed (because the scheduled maintenance window has closed), and incident reports may be generated based on the alarms. This can lead to creation of undesired incident reports. It is preferred that maintenance personnel who cannot complete a maintenance task in the scheduled maintenance interval use the cell site maintenance tracking system 108 to extend the scheduled maintenance interval, whereby alarms do not spuriously result in creation of incident reports.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define rules for when an alarm leads to automatic generation of an incident report, as described herein. In an embodiment, the alarm configuration system 110 may define the criteria by which the incident management application 114 may determine that a path in the AAV network to the cell site is down and that the AAV network has not provided any redundancies for the cell site (e.g., any other diverse paths through the AAV to the cell site). In an embodiment, the alarm configuration system 110 may define the criteria by which the incident reporting application 118 generates the second incident report, as further described herein. The alarm configuration system 110 may define rules for how alarms are cleared.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the system 100, as described further hereinafter. Incident reports may be referred to in some contexts or by other communication service providers as tickets or trouble tickets.

In an embodiment, the incident management application 114 may determine whether the AAV network includes redundant diverse paths based on whether the alarms include a pattern of alarms that are each associated with a cell site. The pattern of alarms may include at least a path down alarm and a cell site unreachable alarm, both for the same cell site. The incident reporting application 118 may generate two different incident reports (i.e., a first incident report and a second incident report) in response to determining that redundant diverse paths are not configured in the AAV network. In an embodiment, the incident reporting application 118 may update incident reports documenting alarms that the incident reporting system 118 deem to be associated with the lack of redundant diverse paths in the AAV network.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen after receiving an indication that the AAV has resolved the issue and configured redundant diverse paths to the cell site through the AAV network. Automated closure may happen after receiving confirmation that the telecommunications service provider has received credits or compensation for the outage occurring because of the AAV's failure to provide contracted-for redundancy services. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

The NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116. In an embodiment, the NOC dashboard 116 may display the second incident report, such that the NOC personnel may use the details in the second incident report to request credits or compensation from the AAV, as described above.

Figure 2A:
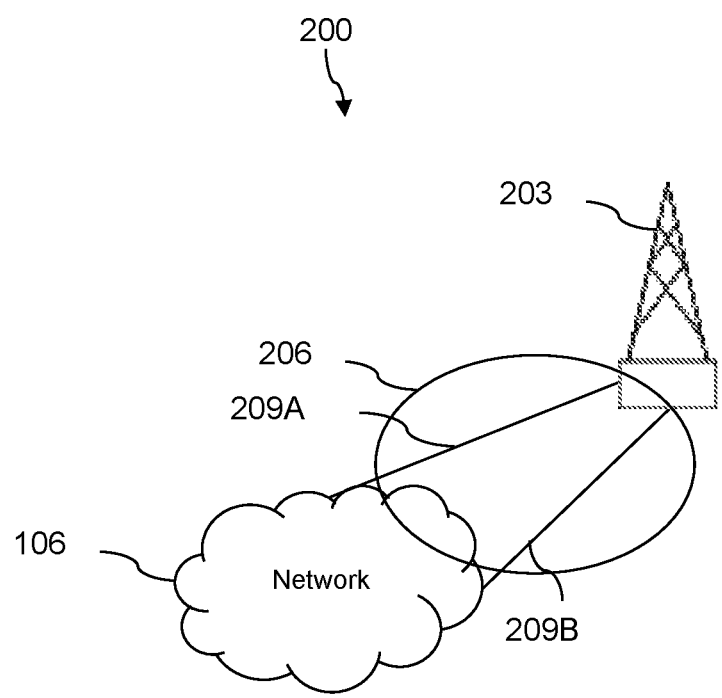
FIG. 2A and FIG. 2B are illustrations a portion of the system of FIG. 1 according to an embodiment of the disclosure.

Turning now to FIG. 2A, shown is a portion 200 of the communication system 100, including network 106 and a cell site 203. As mentioned above, the cell site 203 is part of a RAN operated by a telecommunications service provider. The cell site 203 may be coupled to the network 106 via an AAV network 206. The AAV network 206 may include devices and equipment, such as, for example, routers, bridges, switches, virtual networks (VN), gateways, fibers, wired and wireless links, and/or any other type network element (NE) to provide high bandwidth connections at relatively low costs. The AAV network 206 is operated by an AAV separate from and external to the telecommunications service provider, but the telecommunications service provider and the AAV may be parties to a contract by which telecommunications service provider uses the AAV to forward traffic between the network 106 and the cell site 203. As mentioned, the contract may include a provision by which the AAV provides redundant diverse paths through the AAV network 206, and the paths are shown as backhaul link 209A and backhaul link 209B. Backhaul link 209A and backhaul link 209B may be logical paths that flow through different combinations of devices or equipment within the AAV network. Nevertheless, both backhaul link 209A and backhaul link 209B comprise logical paths between network 106 and cell site 203, creating redundant diverse paths to the cell site 203 in the AAV network 206. If one backhaul link 209A between the network 106 and the cell site 203 goes down or fails, the AAV network 206 may forward traffic to the cell site 203 using backhaul link 209B instead.

The AAV network 206 may be considered as providing redundancy to the cell site 203 when at least two backhaul links 209A and 209B are configured in the AAV network 206 between network 106 and the cell site 203. However, when the AAV network 206 only includes a single logical path, or no logical paths, between network 106 and the cell site 203, the AAV network 206 may be considered as failing to provide redundancy to the cell site 203, and thus breaching the contract with the telecommunications service provider.

In some cases, the AAV network 206 may at one point in time have redundant diverse paths to the cell site 203 (i.e., have more than one backhaul links 209A-B), but then an operator of the AAV may reconfigure all the logical paths in the AAV network 206. The reconfiguration may be due to known issues or problems in the AAV network 206, or the reconfiguration may be automated to manage the bandwidth in the AAV network 206 or even the lifetime of the equipment in the AAV network 206. Sometimes these reconfigurations may result in a change to the redundancies in the AAV network 206, and the telecommunications service provider may be unaware of these reconfigurations, much less how the reconfigurations affect the traffic flow to the cell site. As described herein, the embodiments allow the telecommunications service provider to use the alarms to gain insight into the inner workings of the AAV network 206 and generate incident reports accordingly to improve network availability within the AAV network 206. In other words, the alarms can be used by a company external to the AAV to gain insights into the AAV network 206, in a secure manner.

While FIG. 2A only shows the AAV network 206 including two backhaul links 209A and 209B, it should be appreciated that the AAV network 206 may include any number of backhaul links 209A and 209B. While only one cell site 203 is shown in FIG. 2A as being serviced by the AAV network 206, it should be appreciated that the AAV network 206 may be used to connect the network 106 to any number of cell sites 203.

Figure 2B:
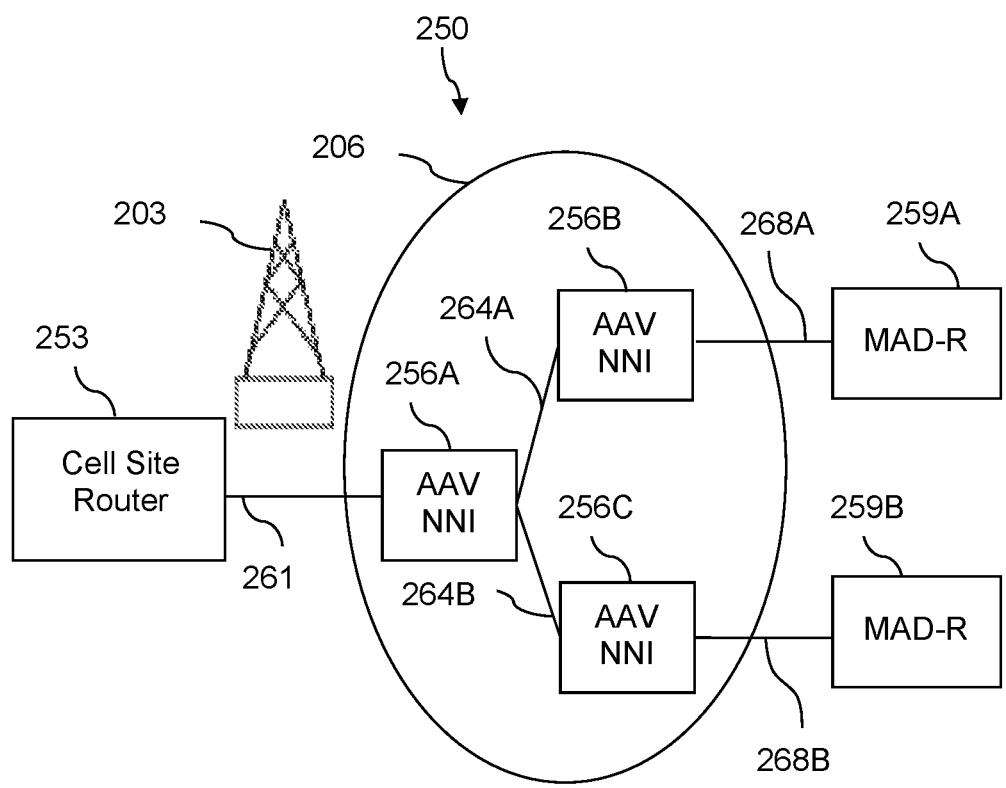

Turning now to FIG. 2B, shown is an example of a portion 250 of the communication system 100. Similar to portion 200 of FIG. 2A, portion 350 also includes the cell site 203 and the AAV network 206. The portion 250 also includes a cell site router 253, multiple AAV NNIs 256A-C in the AAV network 206, and at least two MAD routers 259A-B.

The cell site router 253 may be located with the cell site 203, for example, at the base of the cell site 203. The AAV NNIs 256A-C may be physical circuits or interfaces that connect two or more networks together, defining inter-signaling and management processes. The cell site router 253 may be coupled to the AAV NNI 256A via a link 261, which may be a wired or wireless link. For example, the link 261 may be high speed copper or fiber. Within the AAV network 206, the AAV NNIs 256A-C may be interconnected via links 264A-B, which may be wired or wireless links. For example, links 264A-B may be VLANs. The MAD routers 259A-B may connect the AAV network 206 to the network 106. The AAV NNI 256B may be coupled to the MAD router 259A via a wired or wireless link 268A. Similarly, the AAV NNI 256C may be coupled to the MAD router 259B via a wired or wireless link 268B. For example, links 268A-B may be one or more fibers.

The backhaul links 209A and 209B from FIG. 2A (i.e., the diverse paths to the cell site 203) may be configured between the cell site router 253 and the MAD routers 259A-B. The backhaul links 209A and 209B may both have the cell site 203 as an endpoint, but may pass through different equipment (e.g., different AAV NNIs 256A-C and different links 264A-B and 268A-B) to reach the cell site 203.

Figure 3:
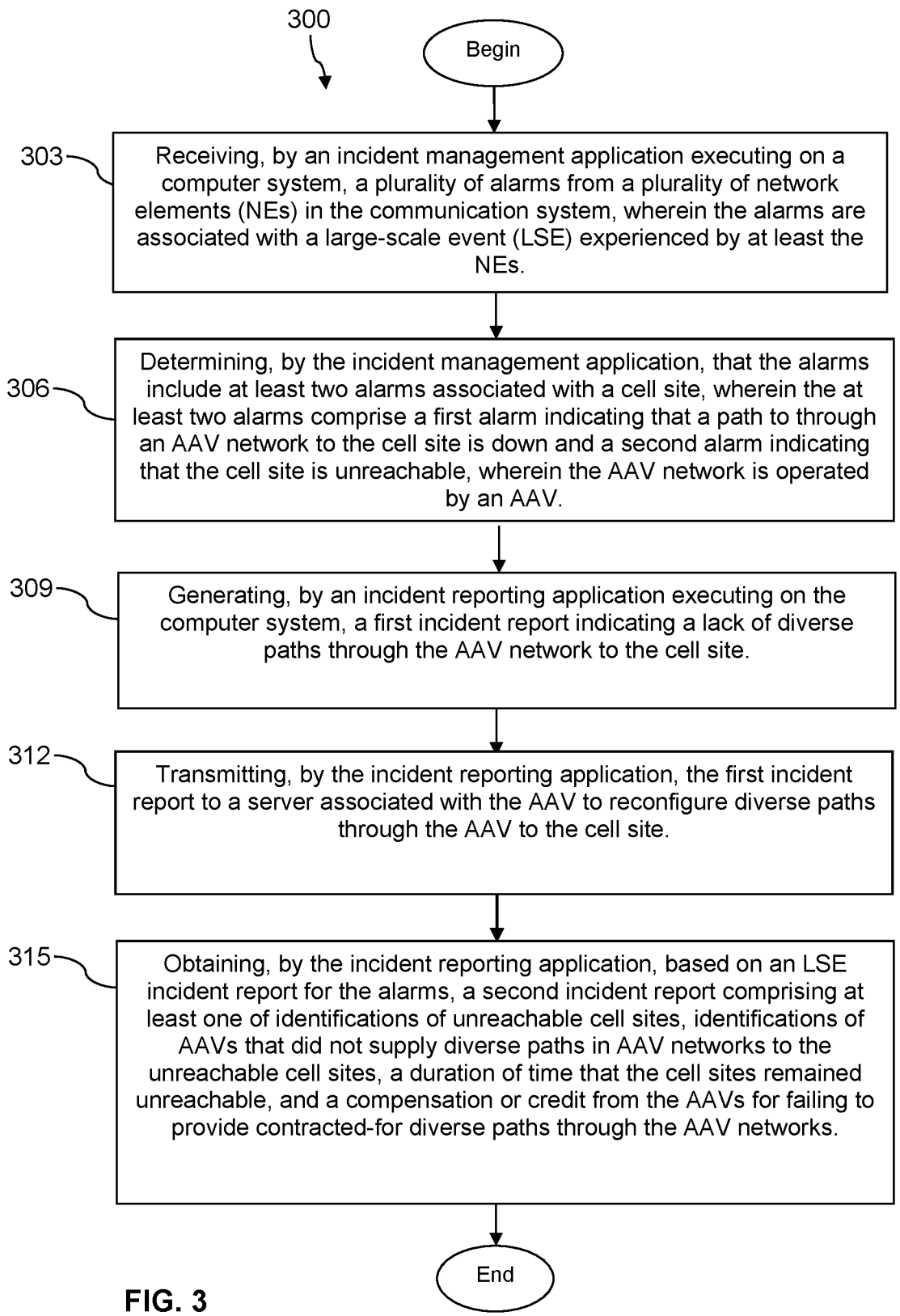
FIG. 3 is a flow chart of a method according to an embodiment of the disclosure.

Turning now to FIG. 3, a method 300 is described. In an embodiment, method 300 may be a method of resolving backhaul link redundancy failures in a communication system 100. Method 300 may be performed after alarms have been configured in the communication system 100 to detect for failures and report the failures to the service provider.

At step 303, method 300 comprises receiving, by an incident management application 114 executing on a computer system, a plurality of alarms from a plurality of network elements (NEs) in the communication system 100. The alarms may be associated with a large-scale event (LSE) experienced by at least the NEs.

At step 306, method 300 comprises determining, by the incident management application 114, that the alarms include at least two alarms associated with a cell site 203. The at least two alarms may include a first alarm indicating that a path through an AAV network 206 to the cell site 203 is down and a second alarm indicating that the cell site 203 is unreachable. The AAV network 206 is operated by an AAV.

At step 309, method 300 comprises generating, by an incident reporting application 118 executing on the computer system, a first incident report indicating a lack of diverse paths (e.g., multiple backhaul links 209A-B) through the AAV network 206 to the cell site 203. At step 312, method 300 comprises transmitting, by the incident reporting application 118, the first incident report to a server associated with the AAV to reconfigure diverse paths through the AAV network 206 to the cell site 203.

At step 315, method 300 comprises obtaining, by the incident reporting application 118, based on an LSE incident report for the alarms, a second incident report comprising at least one of identifications of unreachable cell sites 203, identifications of AAVs that did not supply diverse paths in AAV networks 206 to the unreachable cell sites 203, a duration of time that the cell sites 203 remained unreachable, and a compensation or credit from the AAVs for failing to provide contracted-for diverse paths through the AAV networks 206.

In an embodiment the cell site router 253 is coupled to the AAV network 206 via a link 261 and the AAV network 206 comprises AAV NNIs 256A-C intercoupled by links 264A-C. The cell site router 253 is coupled to one or more network routers (MAD routers 259A-B) via the AAV network 206, in which one or more logical paths (e.g., backhaul links 209A-B) are configured between the cell site router 253 and the network routers. In an embodiment, the logical paths comprise the diverse paths (e.g., backhaul links 209A-B) in the AAV network 206 to the cell site 203. In an embodiment, the links 264A-B intercoupling the NNIs in the AAV network 206 comprise VLANs.

Figure 4:
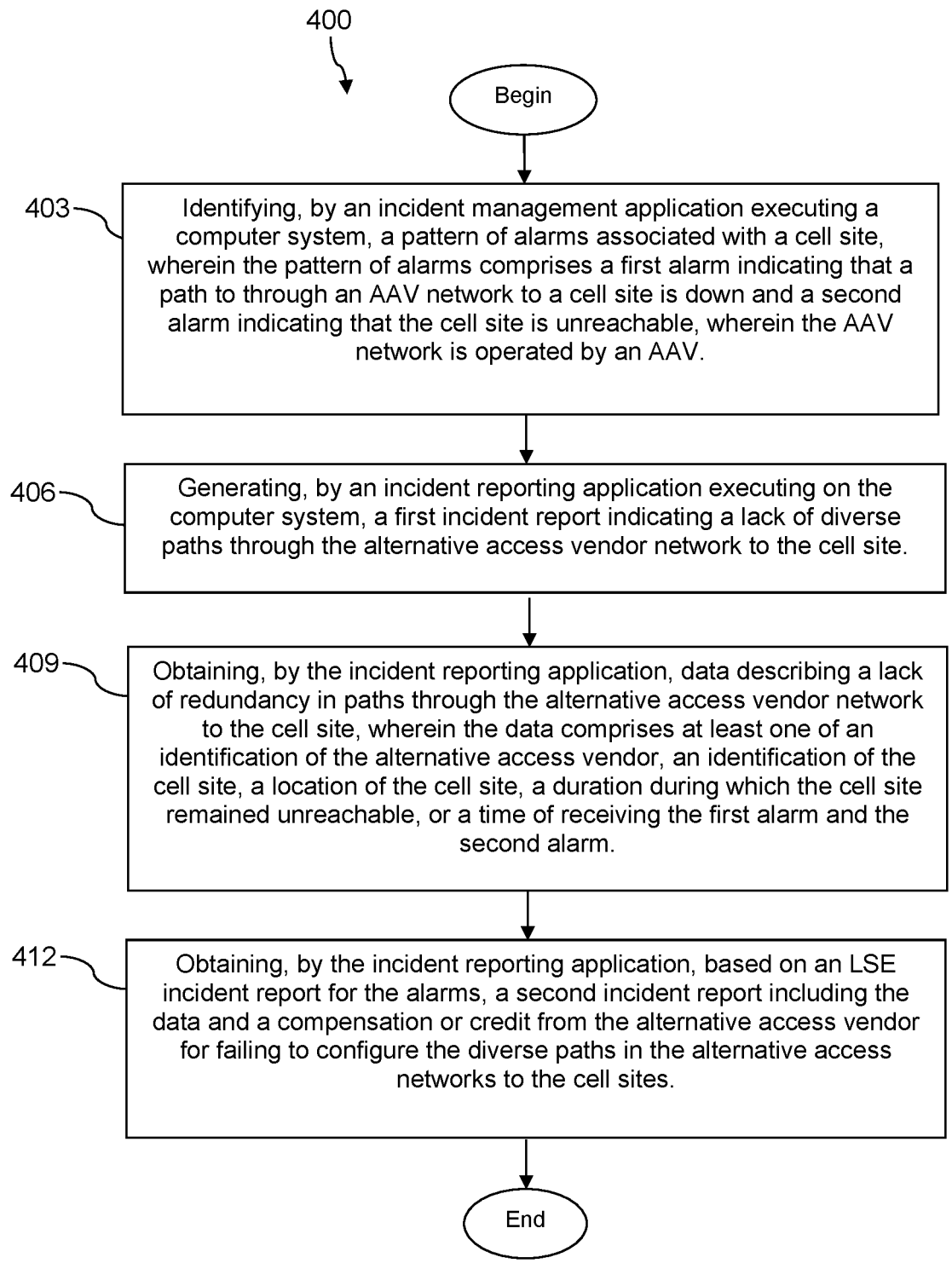
FIG. 4 is a flow chart of another method according to an embodiment of the disclosure.

Turning now to FIG. 4, a method 400 is described. In an embodiment, method 400 may be a method of resolving backhaul link redundancy failures in a communication system 100. Method 400 may be performed after alarms have been configured in the communication system 100 to detect for failures and report the failures to the service provider.

At step 403, method 300 comprises identifying, by an incident management application 114 executing a computer system, a pattern of alarms associated with a cell site 203. The pattern of alarms comprises a first alarm indicating that a path through an AAV network 206 to a cell site 203 is down and a second alarm indicating that the cell site 203 is unreachable. The AAV network 206 is operated by an alternative access vendor.

At step 406, method 400 comprises generating, by an incident reporting application 114 executing on the computer system, a first incident report indicating a lack of diverse paths through the AAV network 206 to the cell site 203. At step 409, method 400 comprises obtaining, by the incident reporting application 118, data describing a lack of redundancy in paths through the AAV network 206 to the cell site 203. The data may comprise at least one of an identification of the AAV, an identification of the cell site 203, a location of the cell site 203, a duration during which the cell site remained unreachable, or a time of receiving the first alarm and the second alarm.

At step 412, method 400 comprises obtaining by, the incident reporting application 114, based on an LSE incident report for the alarms, a second incident report including the data and a compensation or credit from the alternative access vendor for failing to configure the diverse paths in the alternative access networks to the cell sites.

Figure 5A:
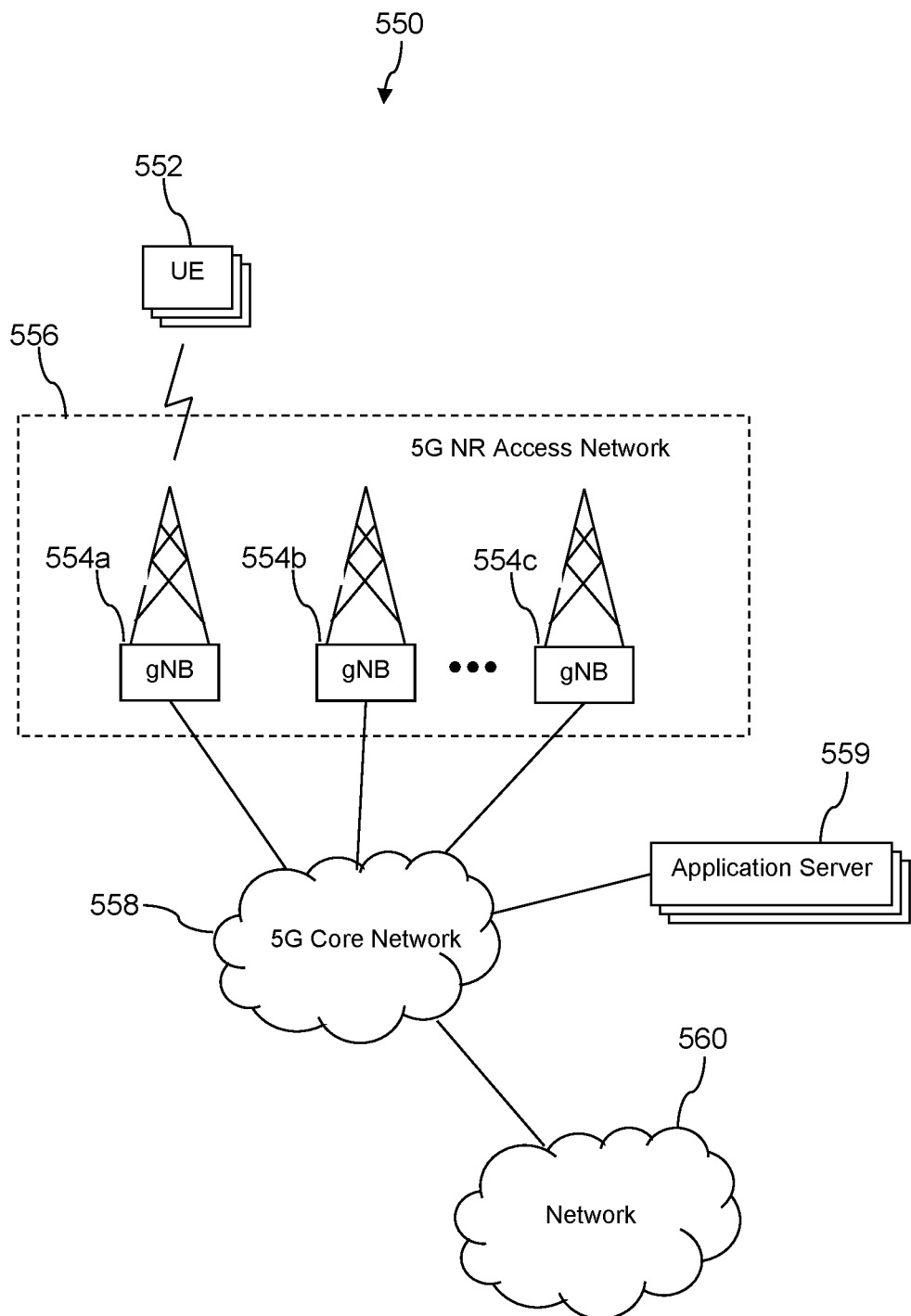
FIG. 5A and FIG. 5B are block diagrams of a 5G network according to an embodiment of the disclosure.

Turning now to FIG. 5A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/ or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
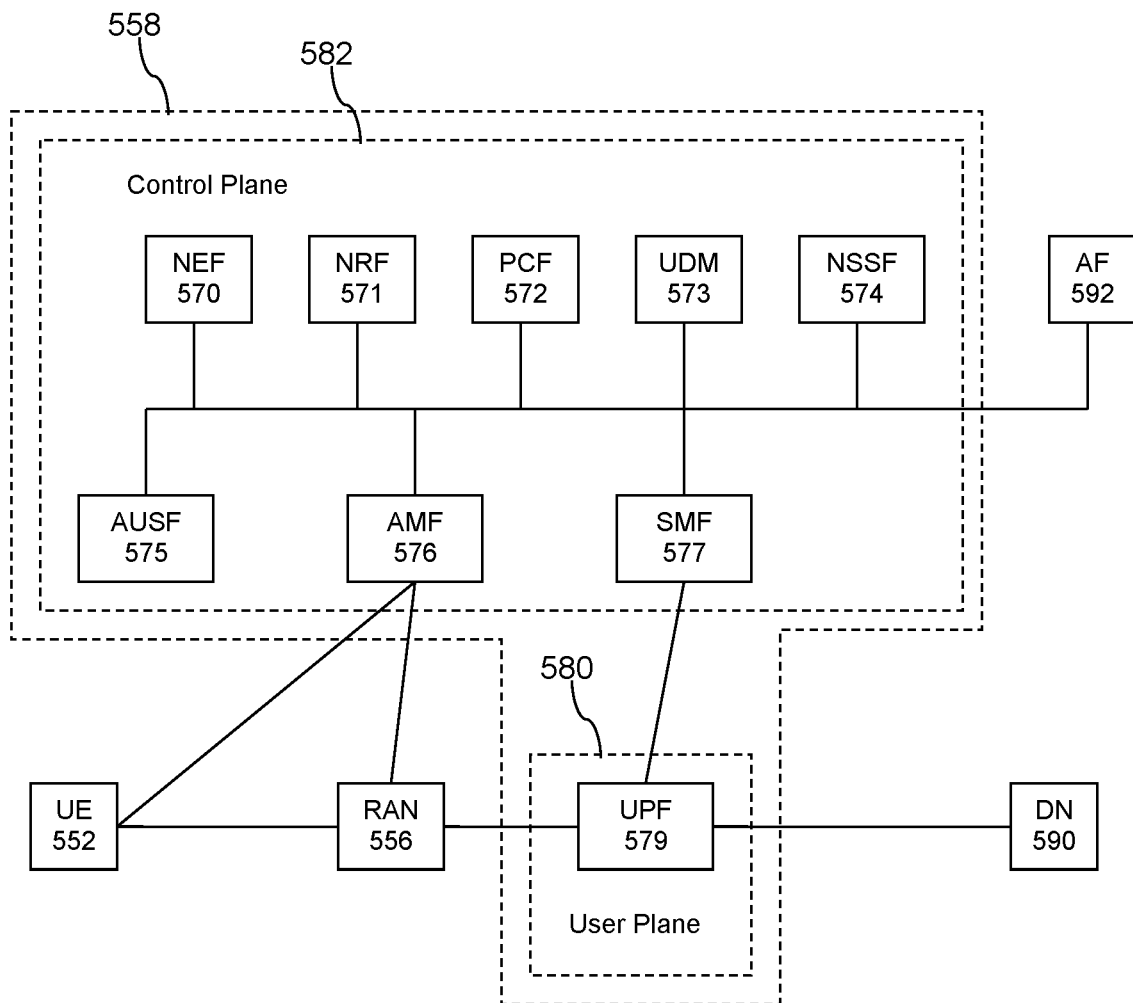

Turning now to FIG. 5B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
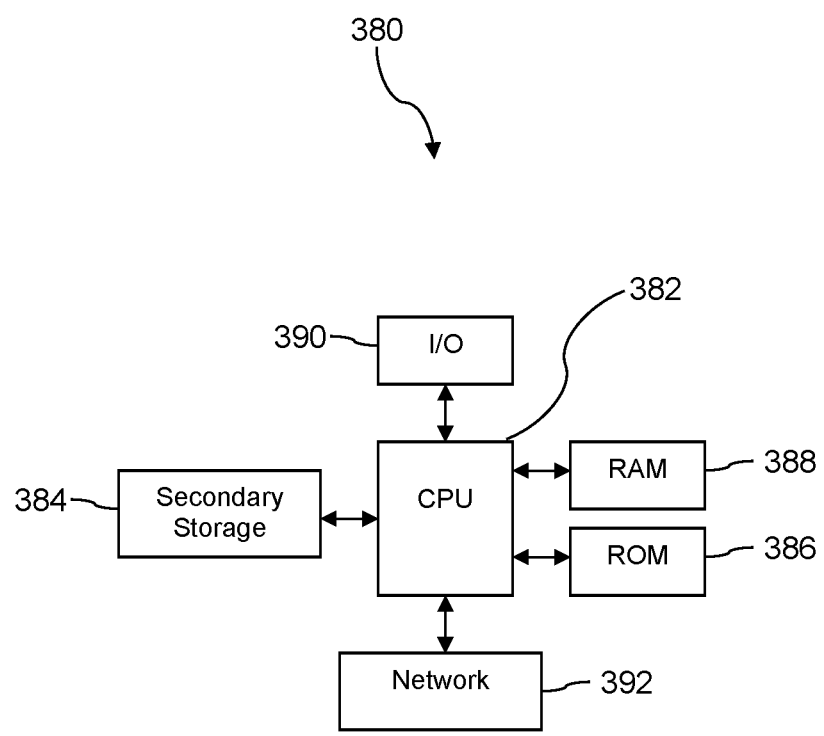
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) radio frequency identity (RFID). The radio transceiver cards may promote radio communications using 5G, 5G New Radio, or 4G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of resolving cell site backhaul link redundancy failures in a communication system, comprising:
receiving, by an incident management application executing on a computer system, a plurality of alarms from a plurality of network elements (NEs) in the communication system, wherein the alarms are associated with a large-scale event (LSE) experienced by at least the NEs;
determining, by the incident management application, that the alarms include at least two alarms associated with a cell site, wherein the at least two alarms comprise a first alarm indicating that a path through an alternative access vendor network to the cell site is down and a second alarm indicating that the cell site is unreachable, wherein the alternative access vendor network is operated by an alternative access vendor;
generating, by an incident reporting application executing on the computer system, a first incident report indicating a lack of diverse paths through the alternative access vendor network to the cell site;
transmitting, by the incident reporting application, the first incident report to a server associated with the alternative access vendor to reconfigure diverse paths through the alternative access vendor network to the cell site; and
obtaining, by the incident reporting application, based on an LSE incident report for the alarms, a second incident report comprising at least one of identifications of unreachable cell sites, identifications of alternative access vendors that did not supply diverse paths in alternative access vendor networks to the unreachable cell sites, a duration of time that the cell sites remained unreachable, and a compensation or credit from the alternative access vendors for failing to provide contracted-for diverse paths through the alternative access vendor networks.

2. The method of claim 1, wherein the NEs comprise cell sites.

3. The method of claim 1, wherein a cell site router associated with the cell site is coupled to the alternative access vendor network via a physical link, and wherein the alternative access vendor network comprises a plurality of network-to-network interfaces (NNIs) intercoupled by links.

4. The method of claim 3, wherein the cell site router is coupled to one or more network routers via the alternative access vendor network, and wherein one or more logical paths are configured between the cell site router and the network routers.

5. The method of claim 3, wherein the links intercoupling the NNIs in the alternative access vendor network comprise virtual local area networks (VLANS).

6. The method of claim 3, wherein the network routers comprise Metro Ethernet Aggregating Device (MAD) routers.

7. A telecommunication network management system, comprising:
an incident management application executing on a first computer system, wherein the incident management application is configured to:
receive a plurality of alarms from a plurality of network elements (NEs) in the telecommunication network management system; and
determine that the alarms include a pattern of alarms associated with a cell site, wherein pattern of alarms comprises a first alarm indicating that a path through an alternative access vendor network to a cell site is down and a second alarm indicating that the cell site is unreachable; and
an incident management application that executes on a second computer system, wherein the incident management application is configured to:
generate a first incident report indicating a lack of diverse paths through the alternative access vendor network to the cell site; and
obtain a second incident report identifying at least one of unreachable cell sites, alternative access vendors that did not supply diverse paths in alternative access vendor networks to the unreachable cell sites, a duration during which the cell sites remained unreachable, and a compensation or credit from the alternative access vendor for failing to configure the diverse paths in the alternative access vendor networks to the cell sites.

8. The system of claim 7, wherein the incident reporting application is further configured to transmit the first incident report to a server associated with the alternative access vendor to reconfigure the diverse paths in the alternative access vendor network to the cell site.

9. The system of claim 7, wherein a cell site router associated with the cell site is coupled to the alternative access vendor network via a physical link, and wherein the alternative access vendor network comprises a plurality of network-to-network interfaces (NNIs) intercoupled by links.

10. The system of claim 9, wherein the cell site router is coupled to one or more network routers via the alternative access vendor network, and wherein one or more logical paths are configured between the cell site router and the network routers.

11. The system of claim 9, wherein the links intercoupling the NNIs in the alternative access vendor network comprise virtual local area networks (VLANS).

12. The system of claim 9, wherein the network routers comprise Metro Ethernet Aggregating Device (MAD) routers.

13. The system of claim 7, wherein the second incident report is obtained when a large-scale event incident report indicates that a first plurality of cell sites are associated with the first alarm and the second alarm while a second plurality of cell sites are associated with only the first alarm, wherein a quantity of the second plurality of cell sites is greater than a quantity of the first plurality of cell sites.

14. A method of resolving cell site backhaul link redundancy failures in a communication network, comprising:
identifying, by an incident management application executing a computer system, a pattern of alarms associated with a cell site, wherein the pattern of alarms comprises a first alarm indicating that a path through an alternative access vendor network to a cell site is down and a second alarm indicating that the cell site is unreachable, wherein the alternative access vendor network is operated by an alternative access vendor;
generating, by an incident reporting application executing on the computer system, a first incident report indicating a lack of diverse paths through the alternative access vendor network to the cell site;
obtaining, by the incident reporting application, data describing a lack of redundancy in paths through the alternative access vendor network to the cell site, wherein the data comprises at least one of an identification of the alternative access vendor, an identification of the cell site, a location of the cell site, a duration during which the cell site remained unreachable, or a time of receiving the first alarm and the second alarm; and obtaining, by the incident reporting application, a second incident report including the data and a compensation or credit from the alternative access vendor for failing to configure the diverse paths in the alternative access vendor networks to the cell sites.

15. The method of claim 14, transmitting, by the incident reporting application, the second incident report to at least one of a network operation center (NOC) or to a server associated with the alternative access vendor.

16. The method of claim 14, further comprising transmitting, by the incident reporting application, the first incident report to a server associated with the alternative access vendor to reconfigure the diverse paths in the alternative access vendor network to the cell site.

17. The method of claim 16, wherein a cell site router associated with the cell site is coupled to the alternative access vendor network via a physical link, and wherein the alternative access vendor network comprises a plurality of network-to-network interfaces (NNIs) intercoupled by links.

18. The method of claim 17, wherein the cell site router is coupled to one or more network routers via the alternative access vendor network, and wherein one or more logical paths are configured between the cell site router and the network routers.

19. The method of claim 17, wherein the links intercoupling the NNIs in the alternative access vendor network comprise virtual local area networks (VLANS).

20. The method of claim 17, wherein the network routers comprise Metro Ethernet Aggregating Device (MAD) routers.

* * * * *